Figure 1:
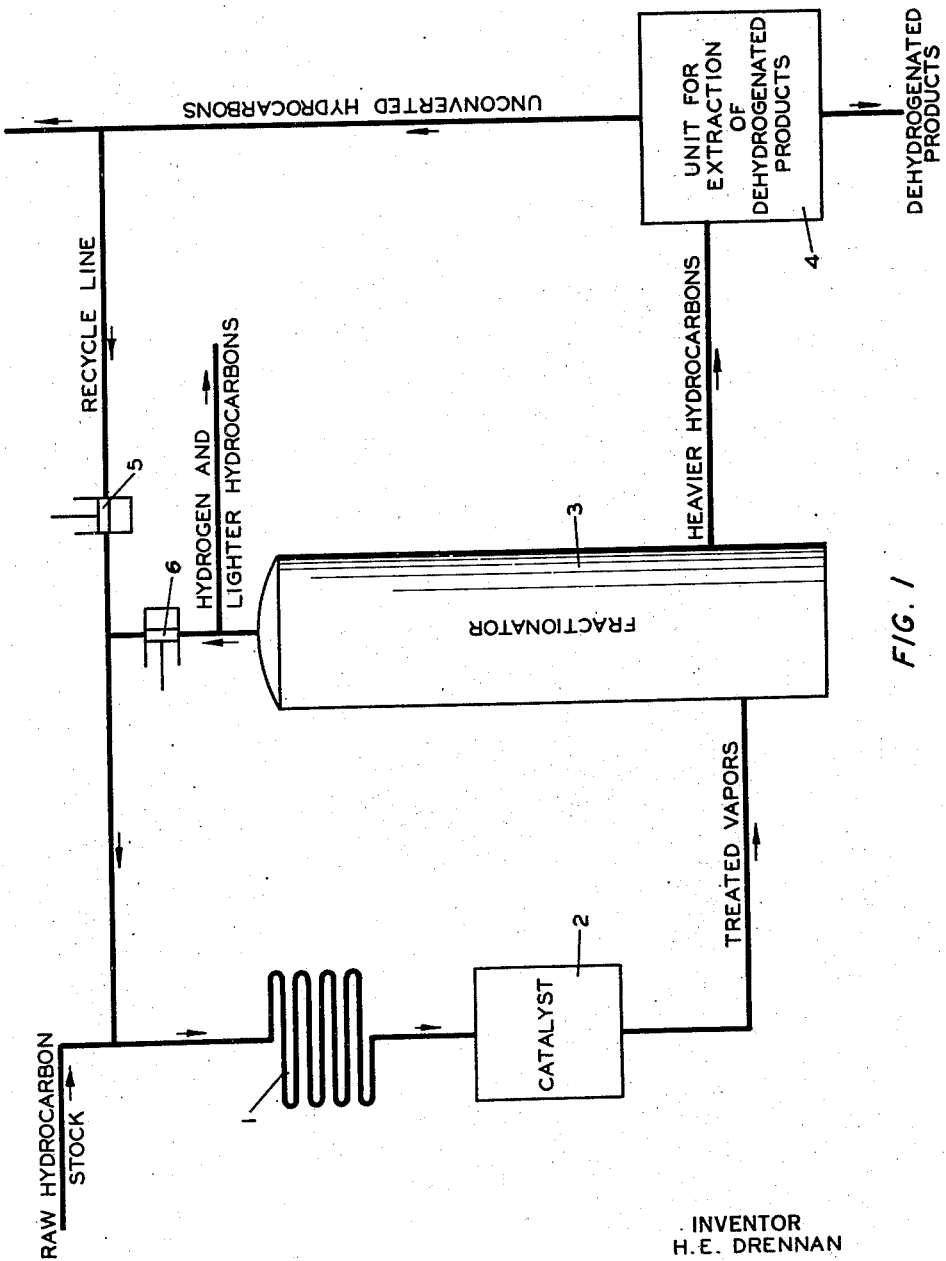

March 20, 1945. H. E. DRENNAN 2,371,809
PROCESS FOR THE DEHYDROGENATION OF HYDROCARBONS
Filed Aug. 19, 1940 2 Sheets-Sheet 2

INVENTOR
H. E. DRENNAN
BY
ATTORNEY

Patented Mar. 20, 1945

2,371,809

UNITED STATES PATENT OFFICE 2,371,809

PROCESS FOR THE DEHYDROGENATION OF HYDROCARBONS

Harry E. Drennan, Bartlesville, Okla., assignor to Phillips Petroleum Company, a corporation of Delaware Application August 19, 1940, Serial No. 353,306

5 Claims. (Cl. 260—680)

This invention relates to the treatment of straight-chain hydrocarbons and in a more specific sense to a process for the catalytic dehydrogenation of paraffinic and olefinic hydrocarbons to produce a higher degree of unsaturation. The invention is directed primarily to the treatment of such hydrocarbons having three to six carbon atoms although it may be applied also to hydrocarbons having six or more carbon atoms in chain arrangement.

While providing a process broadly applicable to the dehydrogenation of hydrocarbons such as are contained in or derived from petroleum and petroleum products, a particular object of the present invention is the conversion of the normally gaseous hydrocarbons as defined above to commercially valuable olefins and/or diolefins. This object is accomplished with a practical minimum of undesirable side reactions.

The olefins of the aliphatic series are valuable raw materials for many purposes. They are readily convertible into valuable products of industrial importance such as alcohols, ethers, esters, glycols, acids and olefin oxides. In addition the olefin polymerization and condensation products are useful as solvents and as fuels, and as components which impart anti-knock qualities to fuel mixtures.

The mono-olefins are of especial value as sources of diolefins, the production of which involves a further dehydrogenation of mono-olefins yielding diolefins with the same number of carbon atoms. These diolefins are readily utilized in the production of high molecular weight polymers and other valuable derivatives. Thus a further object of this invention is to provide a process for the efficient conversion of mono-olefinic hydrocarbons of the type described to diolefins by catalytic dehydrogenation.

The process according to the present invention comprises contacting a dehydrogenatable hydrocarbon containing from three to six carbon atoms to the molecule in vapor phase with a solid adsorbent granular catalyst consisting of activated brucite at a suitable combination of temperature, pressure, and time of contact to control the character and extent of the dehydrogenation. By this means I produce a practical yield of olefins and diolefinic hydrocarbons depending on the charge stock, with a minimum of undesirable by-products and/or product losses.

I have found that the natural mineral ore, brucite, is a highly satisfactory catalyst for the selective dehydrogenation of the normally gaseous paraffin hydrocarbons and of the corresponding olefinic hydrocarbons. Brucite is composed of a major proportion of hydrated magnesium oxide and minor proportions of compounds such as oxides of iron, silica, and the like. In the natural ore, the hydrated magnesium oxide or hydroxide is presumably largely colloidal in form, and heating to remove a portion of the water of hydration converts the ore into a highly porous activated form with satisfactory hardness and resistance to shattering. The great extent of active surfaces thus obtained contributes to the high catalytic activity of the activated material.

In this connection I have found that activated brucite is far more active in promoting the conversion of hydrocarbons than magnesium oxide from other sources. Thus, synthetic magnesia preparations either in pill or powder form or supported inert carriers are inferior in catalytic activity to activated brucite. Similarly magnesia prepared from magnesite or other complex magnesium compounds does not have the catalytic activity of activated brucite. The peculiar physical structure and/or the promoting action of the various components other than magnesium compounds present in activated brusite apparently account for the differences in catalytic activity, although the exact factors influencing catalytic activity are admittedly obscure and unpredictable.

The brucite employed as a catalyst may be activated by thermal treatment under such conditions that at least a portion of chemically combined water is removed without thereby destroying the peculiar physical structure of the ore. In the heating process, water is given off commencing at about 400° F. and continuing up to about 1500° F. and above. It is not known whether this upper limit represents the ultimate in dehydration, but higher temperatures tend to powder the brucite and reduce it to a catalytically inactive form resembling synthetic magnesia. During the activation process, a slow stream of inert gas may be passed through the heated mass to aid in the removal of water vapor. The activated brucite is thereby obtained as hard, porous granules which are not easily shattered by handling or repeated cycles of spending and regeneration.

Brucite is extremely resistant to poisoning by sulfur compounds and other impurities associated with the raw materials to be treated by my process. This resistance to sulfur poisoning is undoubtedly due to the conversion of sulfur compounds to hydrogen sulfide which is concurrently desorbed by the catalyst. Brucite retains its activity for promoting dehydrogenation reactions over relatively long periods of use at high temperatures. Also when there is a loss of activity due to tar and/or carbon deposition, the initial activity is readily and inexpensively restored by the removal of the organic deposits.

When the brucite catalyst has lost its activity to the extent that its use is no longer practical, it may be economically reactivated in place. The reactivation is accomplished by passing air or other suitable oxygen-containing gas through the heated material. Usually steam or other inert gas is added along with the oxygen-containing gas during reactivation in order to regulate the temperature of the operation by controlling the rate of combustion of the organic deposits. Temperatures above 1500° F. are avoided since the activity of the catalyst may be destroyed due to a change in physical structure. The catalyst may be repeatedly reactivated and its initial activity thus restored after each period of service.

The dehydrogenation of the low-boiling paraffin hydrocarbons containing three or more carbon atoms over activated brucite is preferably carried out at temperatures within the range of 925° to about 1200° F. At lower temperatures the catalyst is less active and satisfactory conversion is not obtained. At temperatures above 1300° F. prohibitively short contact times are required to suppress cracking reactions and the conversion of paraffins to olefins is low due to the fact that equilibrium is not attained in the dehydrogenation reactions. Also, at the higher temperatures above 1300° F. the catalyst is more rapidly deactivated by carbon deposition, and the process is more economically operated within the preferred temperature range and at contact times favoring equilibrium.

High pressures are not necessary in my process as applied to paraffin hydrocarbons, as excellent results are obtained at moderate pressure between 0.3 and 20 atmospheres absolute. Usually it is desirable to operate at low super-atmospheric pressures which will allow subsequent processing of the effluent gases from the catalytic treatment but which are not high enough to unfavorably influence the dehydrogenation reaction.

The dehydrogenation of the low-boiling olefine such as the butenes over activated brucite is preferably carried out at temperatures in the higher portion of my temperature range, usually between about 1100° and 1400° F. At lower temperatures which may be satisfactory for dehydrogenating the paraffins, I find that suitable conversion of butenes is not obtained. At temperatures above 1400° F. the suppression of decomposition reactions is more difficult and product losses are greater.

In the dehydrogenation of olefins, best results are obtained at atmospheric or sub-atmospheric pressures which help to suppress polymerization reactions and the like which involve the extremely reactive diolefins. Sub-atmospheric pressures may be obtained by vacuum operation or the like.

Another mode of operating at low effective partial pressures of the olefinic material to be dehydrogenated comprises the addition thereto of a suitable gaseous diluent such as nitrogen, carbon dioxide, or a hydrocarbon gas substantially inert under operating conditions. When such a diluent is used, my process may be operated at pressures ranging from sub-atmospheric to 300 pounds gauge. The volume ratio of diluent to dehydrogenatable material may vary from 1:1 to 25:1 depending on the operating pressure. When temperatures near 1300° F. are used, water vapor is a suitable diluent, although at lower temperatures water vapor appears to affect the catalytic activity of brucite adversely and to shorten the active life of the catalyst.

The contact time of reactants with the catalyst and hence the flow rate of the reactants is dependent on the particular hydrocarbon or hydrocarbon mixture being treated, as well as on the operating temperature and pressure. With each particular hydrocarbon or mixture, the temperature and flow rate can be so regulated that satisfactory conversion is obtained with a minimum of cracking and decomposition of reactants and products. In general, flow rates of the order of 1 to 10 liquid volumes of feed stock per hour per volume of catalyst are preferred. At higher temperature levels, shorter contact times are sufficient, therefore still higher flow rates may be employed.

According to one embodiment of my invention heated hydrocarbon vapors are passed at suitable flow rates over a body of brucite catalyst maintained at temperatures between 925° and 1400° F. The effluents from the catalyst chamber containing dehydrogenated products and unconverted hydrocarbons along with lighter gases including hydrogen and small amounts of heavy polymer are then processed for the separation of the dehydrogenated product by fractional condensation or other suitable physical or chemical means, and the unconverted hydrocarbons may be returned for further conversion. If a diluent is used, this may be separated from the light gases and hydrogen and recycled to the fresh feed stream. Alternately, the total dehydrogenated mixture free of fixed gases may be recycled for further dehydrogenation until a suitable olefin concentration is built up.

The process of this invention is well adapted to a two-stage dehydrogenation operation whereby diolefins may be produced from paraffin hydrocarbons. Thus I may dehydrogenate a material such as normal butane over activated brucite at the conditions disclosed as most favorable for the paraffin-olefin conversion to produce a good yield of butenes. The butenes so produced may be then separated from unconverted butane, and dehydrogenated in a second step with activated brucite. The conditions for said second step conform to those disclosed as most favorable for the olefin-diolefin conversion. Alternately, the entire effluent from the first step might be charged to the second step without prior separation of the butenes.

In view of the different conditions of temperature for the two above-named conversions, and the necessity for using an inert diluent or sub-atmospheric pressure for the second step, I prefer to accomplish the conversion of paraffin to diolefin in two separate steps, rather than in a single treatment, and thereby obtain more efficient operation and better yields of diolefin.

Further modifications of the process will be obvious to those skilled in the art and are held within the scope of the foregoing disclosure and the following operative examples.

*Example I*

An activated brucite catalyst was prepared by grinding and sizing brucite to produce particles of approximately 8-20 mesh and calcining at about 1200° F. for two hours while passing a slow stream of nitrogen through the bed. The nitrogen shortened the calcining time by aiding in the dehydration. The resulting brucite catalyst was highly porous and active. About 60 cc. of the catalyst was packed in a tube having an inside diameter of 18 mm. and a heated length of 65 cm.

The catalyst tube was maintained at a temperature of 1100° F. while n-butane vapor was passed through it at atmospheric pressures and a flow rate of 1 liquid volume of butane per hour per volume of catalyst for a period of four hours. Analysis of the effluent gas over the period of treatment showed an average conversion of n-butane to butenes of 25%.

To compare the activity of brucite with a synthetic magnesium oxide catalyst, n-butane was passed under conditions identical with those noted above over a catalyst consisting of magnesium oxide prepared by calcining magnesium carbonate. The conversion of n-butane was decidedly lower, and the butenes produced amount to only 11%.

*Example II*

An activated brucite catalyst prepared as noted in Example I was maintained at an average temperature of 1200° F. while a mixture of one part of butene-1 and three parts of carbon dioxide were passed through it at a flow rate equivalent to two liquid volumes of feed stock per hour per volume of catalyst. Samples of the effluents during the run indicated an average conversion per pass of butene-1 to butadiene corresponding to about 15 per cent of the butene-1.

*Example III*

Propane was passed in vapor form over an activated brucite catalyst at temperatures between 1180° and 1200° F. and a flow rate of one liquid volume of propane per hour per volume of catalyst. The conversion of propane to propene over a period of 12 hours averaged about 10%.

If desired, the hydrocarbon vapors may be given two or more successive treatments over the activated brucite catalyst in a series of towers or the vapors or any fraction thereof may be recycled with fresh feed vapors through the catalyst tower. Care should be taken in the recycling of any vapors containing hydrogen that concentrations of hydrogen are not built up which will unfavorably influence the reaction. In the case of successive treatments some additional heat may be supplied to the vapors prior to the second and/or successive passages over the catalyst.

Figure 1 represents schematically one type of apparatus in which my process may be used. These drawings show fresh hydrocarbon feed vapors entering a heater 1 where they are raised to the desired treating temperature. From the heater the hot vapors pass directly to the catalyst chamber 2, and after passage over the catalyst, the treated vapors go to the fractionating unit 3. In the fractionating unit the vapors are fractionated to send the hydrogen and lighter hydrocarbons overhead while the heavier hydrocarbons pass to the unit 4 for extraction of dehydrogenated products. From 4 the unconverted hydrocarbons may be returned through the recycle line and pump 5 to the fresh feed line ahead of the heater. Also a portion of the lighter gases may be recycled to the heater and catalyst chamber through pump 6.

Figure 4:
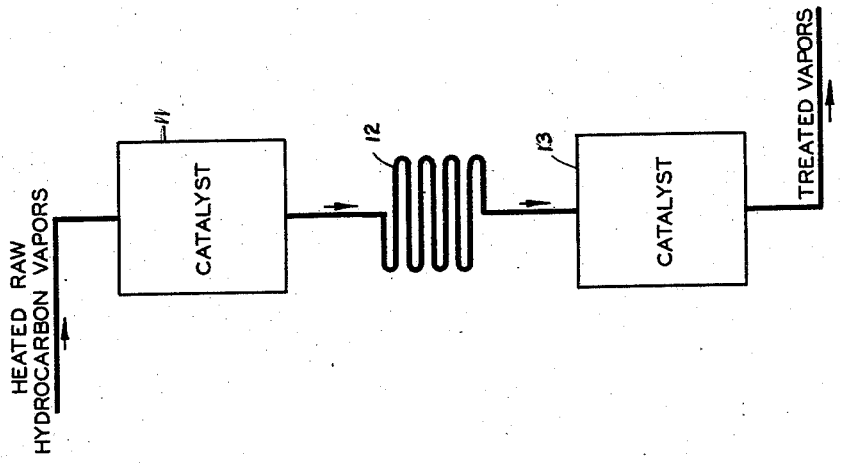
Figure 3:
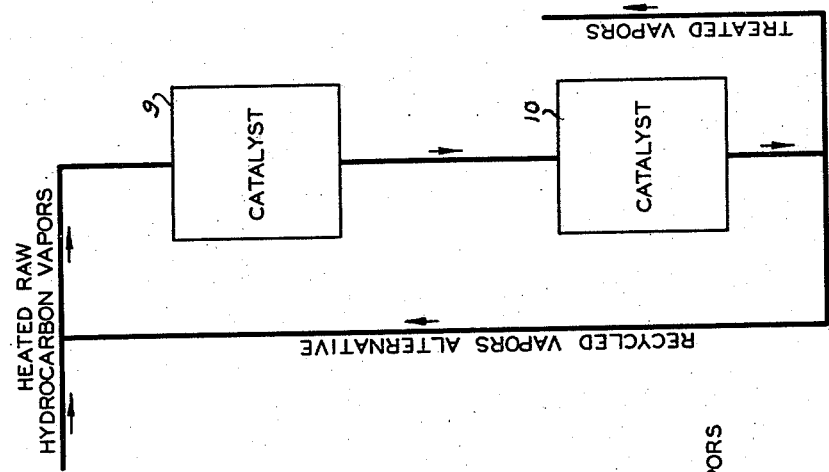
Figure 2:
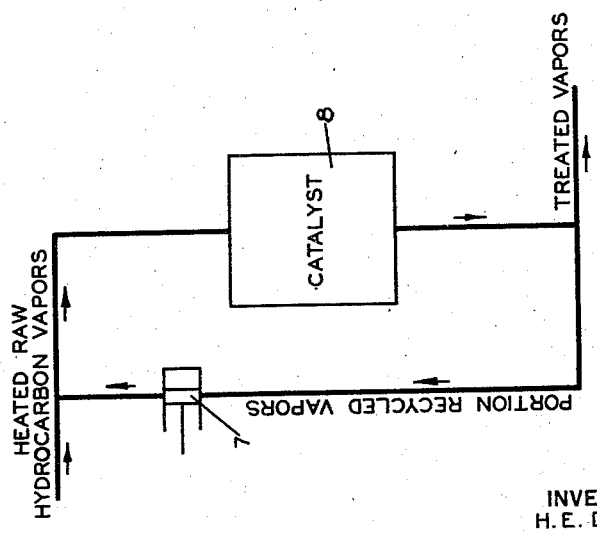

Figures 2, 3 and 4 represent schematically alternative forms of apparatus for the practice of the processes of the invention, wherein one and two catalyst chambers or zones are used. These figures represent portions of the complete apparatus shown schematically in Figure 1, and may be considered in connection with Figure 1 by interposition in the circuit in place of catalyst chamber 2. Figure 2 represents schematically apparatus for the recycling of part of the stream of hot treated vapors for a second pass through the catalyst zone or tower. In this instance, the stream of hot treated vapors leaving the catalyst zone or tower 8 is split, one part going through a compressor 7 (or its equivalent) wherein the pressure is raised just enough to force the recycled vapors into the stream of heated raw vapors prior to passage into the catalyst zone or tower. Figure 3 illustrates schematically apparatus for the practice of an alternative method for giving hydrocarbon vapors successive treatments in two catalyst zones or towers 9 and 10 in series together with the further alternative of recycling a portion of the hot treated vapors. Figure 4 illustrates schematically an apparatus for practicing a method of supplying additional heat to the hydrocarbon vapors leaving the first catalyst tower 11 in heater 12 prior to passage through the second catalyst tower 13.

The foregoing specification and examples have disclosed and illustrated the invention, but since it is of wide application and the number of examples might be multiplied greatly, neither is to be construed as imposing limitations upon the scope of the invention.

There is disclosed and claimed herein certain subject matter disclosed but not claimed in my prior United States Patent No. 2,181,877.

I claim:

1. A process for the catalytic dehydrogenation of mono-olefinic hydrocarbons containing four to six carbon atoms to produce the corresponding diolefins which comprises passing said mono-olefins admixed with an inert diluent gas to result in a partial pressure of mono-olefins of the order of 0.2 to one atmosphere at total pressures between atmospheric and 50 pounds gauge over a catalyst consisting of brucite at temperatures in the range of 1100° to 1400° F. and flow rates of 1 to 10 liquid volumes of charge per hour per volume of catalyst, treating the effluent vapors to obtain valuable diolefinic products therefrom, and finally recycling the unconverted mono-olefins to the catalyst.

2. A process for the catalytic dehydrogenation of paraffin hydrocarbons containing four to six carbon atoms to produce the corresponding diolefins which comprises passing said hydrocarbons at pressures between atmospheric and 100 pounds gauge over a catalyst consisting of brucite at temperatures within the range of 925° to 1200° F. and flow rates of 1 to 10 liquid volumes of charge per hour per volume of catalyst to convert a substantial proportion of the paraffin charge to olefins, treating the effluent vapors to segregate olefins from unconverted paraffins, recycling said unconverted paraffins to the first catalytic zone, passing said olefins admixed with an inert diluent to produce partial pressures of olefins of the order of 0.2 to one atmosphere at total pressures of from atmospheric to 50 pounds gauge over a catalyst consisting of brucite at temperatures within the range of 100° to 1400° F. and flow rates of 1 to 5 liquid volumes of charge per hour per volume of catalyst to convert a substantial proportion of olefins to diolefins, separating the resulting diolefins from the unconverted olefins, and recycling the latter with fresh olefin charge to the second catalytic zone.

3. A process for the catalytic dehydrogenation of paraffin and olefin hydrocarbons containing three to six carbon atoms to produce the corresponding olefins and diolefins which comprises contacting said hydrocarbons in vapor form with a catalyst consisting of brucite under conversion conditions of temperature and pressure such that a substantial dehydrogenation of said hydrocarbons without objectionable occurrence of cracking and decomposition reactions is obtained, the conversion temperature being in the range of 925° to 1400° F., said brucite having been prepared in active form by heating granular brucite ore at from 400° to 1500° F. in a stream of inert gas to remove a portion of chemically combined water and convert the brucite into a highly porous activated form with satisfactory hardness and resistance to shattering and without destruction of the physical structure of the ore.

4. A process for the catalytic dehydrogenation of mono-olefinic hydrocarbons containing four to six carbon atoms to produce the corresponding diolefins which comprises passing said mono-olefins admixed with an inert diluent gas to result in a partial pressure of mono-olefins of the order of 0.2 to 1 atmosphere at a total pressure between atmospheric and 50 pounds gauge over a catalyst consisting of activated brucite at a temperature within the range of 1100° to 1400° F. and at a flow rate of from 1 to 10 liquid volumes of charge per hour per volume of catalyst, said activated brucite catalyst having been prepared by heating granular brucite mineral at from 400° to 1500° F. in a stream of inert gas to remove a portion of chemically combined water and convert the brucite into a highly porous activated form with satisfactory hardness and resistance to shattering and without substantial destruction of the physical structure of the brucite, and thereafter treating the effluent hydrocarbon vapors to recover valuable diolefinic products therefrom.

5. A process for the catalytic dehydrogenation of paraffin hydrocarbons containing four to six carbon atoms to produce the corresponding diolefins which comprises passing said hydrocarbons at pressures between atmospheric and 100 pounds gauge over a catalyst consisting of activated brucite at a temperature within the range of 925° to 1200° F. and at a flow rate of from 1 to 10 liquid volumes of charge per hour per volume of catalyst, to convert a substantial proportion of the paraffins in the hydrocarbon charge to olefins, said activated brucite catalyst having been prepared by heating granular brucite mineral at from 400° to 1500° F. in a stream of inert gas to remove a portion of chemically combined water and convert the brucite into a highly porous activated form with satisfactory hardness and resistance to shattering and without substantial destruction of the physical structure of the brucite, and thereafter treating the effluent hydrocarbon to segregate olefins from unconverted paraffins, thereafter passing said olefins admixed with an inert diluent to result in a partial pressure of olefins of the order of 0.2 to 1 atmosphere at a total pressure between atmospheric and 50 pounds gauge over an activated brucite catalyst at a temperature within the range of 1100° to 1400° F. and at a flow rate of from 1 to 10 liquid volumes of charge per hour per volume of said catalyst to convert a substantial proportion of olefins to diolefins, and separating the resulting diolefins from the unconverted olefins.

HARRY E. DRENNAN.